(12) United States Patent
Yamada

(10) Patent No.: US 8,355,965 B2
(45) Date of Patent: Jan. 15, 2013

(54) BATTERY EXCHANGE SERVICE SYSTEM AND CHARGING METHOD THEREFOR, AND PORTABLE DEVICE

(75) Inventor: Kazuo Yamada, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 1042 days.

(21) Appl. No.: 11/884,707

(22) PCT Filed: Feb. 16, 2006

(86) PCT No.: PCT/JP2006/302760
§ 371 (c)(1),
(2), (4) Date: May 21, 2008

(87) PCT Pub. No.: WO2006/090636
PCT Pub. Date: Aug. 31, 2006

(65) Prior Publication Data
US 2008/0281732 A1    Nov. 13, 2008

(30) Foreign Application Priority Data

Feb. 22, 2005 (JP) .................................. 2005-045844

(51) Int. Cl.
G07B 17/00 (2006.01)
G07F 19/00 (2006.01)
(52) U.S. Cl. ......................................................... 705/30
(58) Field of Classification Search ...................... 705/30
See application file for complete search history.

(56) References Cited

U.S. PATENT DOCUMENTS
4,433,278 A * 2/1984 Lowndes et al. .............. 320/116
(Continued)

FOREIGN PATENT DOCUMENTS
JP    06-068912    3/1994
(Continued)

OTHER PUBLICATIONS

Wilcox, J. D. (2008). Studies on two classes of positive electrode materials for lithium-ion batteries. University of California, Berkeley). ProQuest Dissertations and Theses, Retrieved from http://search.proquest.com/docview/304697234?accountid=14753. (304697234).*

(Continued)

Primary Examiner — Seye Iwarere
(74) Attorney, Agent, or Firm — Nixon & Vanderhye, P.C.

(57) ABSTRACT

There is provided a service system that allows a user to charge and repeatedly use a secondary battery and exchanges a battery pack for a charged battery pack. There is provided a battery exchange service system in which a terminal is connected to a management server. The terminal includes an information obtaining unit that obtains battery information and user information; a charging and discharging unit that charges and discharges a battery pack; and a power information generation unit that generates information on an amount of electricity based on the charging and discharging by the charging and discharging unit. The management server includes a battery information database that stores battery information distributed in the battery exchange service system; a contractor information database that stores contractor information for the battery exchange service system; a battery information verification unit that verifies the battery information by the battery information stored in the battery information database; a user information verification unit that verifies the user information by the contractor information stored in the contractor information database; and a charge calculation unit that calculates a charge based on the information on the amount of electricity.

7 Claims, 12 Drawing Sheets

U.S. PATENT DOCUMENTS

| | | | |
|---|---|---|---|
| 5,606,242 A * | 2/1997 | Hull et al. | 320/106 |
| 5,710,501 A * | 1/1998 | van Phuoc et al. | 307/150 |
| 6,278,257 B1 * | 8/2001 | Takada et al. | 320/116 |
| 7,058,484 B1 * | 6/2006 | Potega | 700/297 |
| 7,321,220 B2 * | 1/2008 | Plett | 320/128 |
| 2003/0078797 A1 * | 4/2003 | Kanbara et al. | 705/1 |
| 2004/0070369 A1 * | 4/2004 | Sakakibara | 320/128 |
| 2005/0117050 A1 * | 6/2005 | Jiang | 348/372 |
| 2006/0238167 A1 * | 10/2006 | Arai et al. | 320/132 |

FOREIGN PATENT DOCUMENTS

| | | |
|---|---|---|
| JP | 09-153376 | 6/1997 |
| JP | 2726942 | 12/1997 |
| JP | 2001-184406 | 7/2001 |
| JP | 2001-266954 | 9/2001 |
| JP | 2001-285955 | 10/2001 |
| JP | 2003-007348 | 1/2003 |
| JP | 2003-058605 A | 2/2003 |
| JP | 2003-168483 | 6/2003 |
| JP | 2003-282150 | 10/2003 |
| JP | 2003-288539 | 10/2003 |
| JP | 2003-348757 | 12/2003 |
| JP | 2003-348832 | 12/2003 |
| JP | 2004-128827 | 4/2004 |

OTHER PUBLICATIONS

International Search Report for PCT/JP2006/302760 mailed May 16, 2006.

Japanese Office Action mailed Aug. 17, 2010 in corresponding JP application 2007-504681.

* cited by examiner

**\*\*\*BATTERY EXCHANGE SERVICE\*\*\***

DETAILS OF USE BY CONTRACTOR A THIS TIME ARE AS FOLLOWS:

BATTERY TAKEN BACK FROM CONTRACTOR A: ID NUMBER: 123456
REMAINING DISCHARGEABLE CAPACITY: 1Wh
BATTERY NEWLY PROVIDED TO CONTRACTOR A: ID NUMBER: 654321
FINAL CHARGE CAPACITY: 3Wh

AMOUNT OF POWER PROVIDED IN A SERVICE ON (DATE) WAS 2Wh.
WE ARE LOOKING FORWARD TO SERVING YOU AGAIN.

PHOTOVOLTAIC GENERATED POWER SALES SYSTEM

AMOUNT OF POWER GENERATED BY PHOTOVOLTAIC POWER GENERATION: 1.0kWh (1,000Wh)
NUMBER OF SERVICE USERS TODAY: 5 (40Wh)
POWER BY PHOTOVOLTAIC POWER GENERATION THAT CAN BE SOLD: 960Wh

THANK YOU FOR USING THE SYSTEM

FIG.11

PHOTOVOLTAIC GENERATED POWER SALES SYSTEM

AMOUNT OF POWER GENERATED BY PHOTOVOLTAIC POWER GENERATION: 1.4kWh (1,400Wh)
NUMBER OF SERVICE USERS TODAY: 5 (40Wh)
POWER BY PHOTOVOLTAIC POWER GENERATION THAT CAN BE SOLD: 1360Wh

THANK YOU FOR USING THE SYSTEM

FIG.12

PHOTOVOLTAIC GENERATED POWER SALES SYSTEM

AMOUNT OF POWER GENERATED BY PHOTOVOLTAIC POWER GENERATION: 1.4kWh (1,400Wh)
NUMBER OF SERVICE USERS TODAY: 175 (1,400Wh)
POWER BY PHOTOVOLTAIC POWER GENERATION THAT CAN BE SOLD: 0Wh

THANK YOU FOR USING THE SYSTEM
POWER BY PHOTOVOLTAIC POWER GENERATION IS SOLD OUT
AT THE MOMENT

BATTERY EXCHANGE SERVICE SYSTEM AND CHARGING METHOD THEREFOR, AND PORTABLE DEVICE

This application is the U.S. national phase of International Application No. PCT/JP2006/302760 filed 16 Feb. 2006, which designated the U.S. and claims priority to Japanese Patent Application No. 2005-045844 filed 22 Feb. 2005, the entire contents of each of which are hereby incorporated by reference.

BACKGROUND OF THE INVENTION

1. Field of the Invention

The present invention relates to a battery exchange service system suitable for an exchange service for a battery pack to be used as a power source of an electronic device or an electrical device, a terminal and a charging method for the battery exchange service system, and a portable device for use in the battery exchange service system.

2. Description of Related Art

The recent rapid advance of technology has promoted a reduction in size and weight and an increase in functionality of portable electronic devices. Accordingly, the penetration rate of those devices has dramatically increased. Particularly, mobile phones show remarkable progress. In mobile phones, not only making calls but a variety of usage methods are enabled such as sending and receiving E-mails, viewing Web information, taking pictures and movies, watching and listening to TV and radio, listening to music, etc., downloaded through a line, managing a user's schedule, and executing software such as built-in games or games obtained by download. In addition to the above, cordless technology for portable electronic devices such as notebook computers, PDAs, digital cameras, video cameras, and electronic books and electrical devices and electronic devices such as cordless cleaners, electric-assist bicycles, and electric vehicles is advancing.

In order to drive such devices, secondary batteries which can be repeatedly charged and recharged are used. Particularly, by the appearance of nickel metal hydride batteries and lithium-ion batteries, a reduction in size and weight of secondary batteries is promoted and an increase in capacity of batteries is implemented, significantly contributing to a reduction in size and weight and an increase in functionality of devices.

However, even though the capacity of secondary batteries is increased in response to demands for a reduction in size and an increase in functionality of devices, there is a limit to secondary battery storage power and thus under the present circumstances, a user uses a battery while worrying about the amount of charge remaining in the battery. There may be a case in which when a user is away from home or office, the amount of charge remaining in a battery is used up and accordingly the battery is dead while a device is in use, disabling the use of the device. Recently, simple chargers capable of charging batteries from dry batteries have been available. Some users charge batteries using such chargers and some users carry their chargers at all times and charge batteries in a place where there is a wall outlet. However, it is inconvenient to carry chargers at all times. When primary batteries such as dry batteries are used, the batteries are disposable and thus the costs borne by users are high and also such batteries are not desirable from the point of view of the environment and resources. It may be considered to carry spare batteries; however, spare batteries need to be charged in advance, which is very cumbersome. Furthermore, when fuel batteries are used as power sources, it is considered to carry fuel cartridges; however, carrying spare fuel cartridges is also cumbersome.

To overcome such inconveniences, Japanese Patent Application Laid-Open No. 2003-7348 proposes a system for renting a battery pack. Japanese Patent Application Laid-Open No. 2003-7348 discloses a system in which a user pays a deposit and obtains a battery pack from a distributor and when the user uses a device and the amount of charge remaining in the battery pack decreases and thus the user brings the battery pack to the distributor, a battery pack usage charge is calculated by subtracting the amount of charge remaining in the battery pack.

In addition to the system for exchanging a battery, Japanese Patent Application Laid-Open No. 2003-288539 discloses a system in which data indicating the number of charges and discharges of a battery pack is transmitted to a rental company through a network and for charging according to the number of charges and discharges of a battery pack. Japanese Patent Application Laid-Open No. 2003-288539 discloses a system in which data indicating the number of charges and discharges of a battery pack is transmitted to a rental company through a network and the rental company calculates and charges a battery pack usage charge based on the received data. In a system disclosed in Japanese Patent Application Laid-Open No. 2001-285955, a battery pack installed in a device has a function of measuring an amount of a battery used and a function of transmitting data on the measured amount of a battery used to the device together with a battery ID code and the device has a function of receiving the data on the amount of a battery used from the battery pack and transferring the data to a charging server. The charging server has a function of calculating a battery usage charge based on the received data on the amount of a battery used and a function of transmitting the calculated battery usage charge to an account management server such as a bank.

SUMMARY OF THE INVENTION

The system disclosed in Japanese Patent Application Laid-Open No. 2003-7348 is a system for calculating a usage charge by subtracting an amount of charge remaining in a battery pack from an initial capacity of the battery pack. The system disclosed in Japanese Patent Application Laid-Open No. 2003-7348 does not allow a user to charge a battery pack. Therefore, each time the amount of charge remaining in a battery pack decreases, the user needs to exchange the battery pack for a charged battery pack at a distributor. Accordingly, despite the fact that a secondary battery is used, the user needs to frequently exchange a battery, as with primary batteries.

The system disclosed in Japanese Patent Application Laid-Open No. 2003-288539 is a system in which a battery pack is rented, the number of charges performed by a user on the battery pack is detected, and the user pays a charge according to the amount of charge. Since the system disclosed in Japanese Patent Application Laid-Open No. 2003-288539 transmits battery pack data indicating the number of charges and discharges of a battery pack, to a rental company through a network, the system requires a means of detecting charge and measuring the number of charges and a means of communicating with the rental company.

In the system disclosed in Japanese Patent Application Laid-Open No. 2001-285955, a battery pack needs to have the function of measuring an amount of a battery used and the function of transmitting data on the measurement.

In addition, in the systems disclosed in Japanese Patent Applications Laid-Open No. 2003-288539 and No. 2001-

285955, upon charging, charging is allowed by communication and thus there are problems that individuals' behaviors are grasped and communication cannot be properly established.

An object of the present invention is therefore to provide a service system that normally allows a user to charge and repeatedly use a secondary battery and exchanges a battery pack for a charged battery pack when the battery pack is deteriorated or when the user cannot charge the battery pack because he/she is away from home or office, without the need for the battery pack or a device using the battery pack to manage the amount of charging and discharging and without the need to predict cycle degradation of the battery pack and the like. This eliminates the need to add a function of measuring charging and discharging and a communication function to a battery pack. An object is to provide a system capable of providing a service that can solve a problem that a device becomes unusable because its battery is dead. Furthermore, the battery exchange service system of the present invention has an object to provide a service system that allows a user to exchange, without feeling uncomfortable, for even a battery pack whose battery capacity is somewhat degraded, as long as the degradation is within a set range.

The above-described documents and conventional art are aimed at battery rental services that simply pursue convenience but not at battery exchange services that consider environmental value. The present invention provides a battery exchange service capable of contributing to the environment by distinguishing the type of power to be provided by a battery rental service, from an aspect of environmental value and selling power with high environmental value.

The above object can be achieved by a battery exchange service system including a terminal and a management server connected with each other, wherein the terminal includes an information obtaining unit for obtaining battery information and user information; a charging and discharging unit for charging or discharging a battery pack; a power information generation unit for generating information on an amount of electricity based on charging or discharging by the charging and discharging unit; and an information transmission unit for transmitting to the management server the battery information, the user information, and the information on the amount of electricity, and the management server includes an information reception unit for receiving the battery information, the user information, and the information on the amount of electricity from the terminal; a battery information database for storing battery information distributed in the battery exchange service system; a contractor information database for storing contractor information for the battery exchange service system; a battery information verification unit for verifying the battery information by the battery information stored in the battery information database; a user information verification unit for verifying the user information by the contractor information stored in the contractor information database; a charge calculation unit for calculating a charge based on the information on the amount of electricity; and a transmission unit for transmitting to the terminal a result of verification of the user information, a result of verification of the battery information, and the charge.

Further, the battery exchange service system according to the present invention can effectively achieve the above object by a feature that the power information generation unit generates information on an amount of electricity based on a difference between an amount of charge of a first battery pack to be provided to a user and an amount of charge remaining in a second battery pack taken back from the user.

The above object can be achieved more effectively by a feature that the amount of charge of the first battery pack is determined based on an amount of charge immediately before the first battery pack is given to the user.

The charging and discharging unit according to the present invention preferably has a function of regenerating power discharged from the second battery pack.

The terminal further includes a dropping opening for the second battery pack; and a take-out opening for the first battery pack, and the charging and discharging unit further includes a control unit for fully charging a battery pack present near the take-out opening.

Further, the management server further includes an amount-of-power-generation information reception unit for receiving information on an amount of power generation of renewable energy; and an information processing unit for calculating an amount of sales of renewable energy that can be sold, based on the information on the amount of power generation and the information on the amount of electricity.

The terminal further includes a display unit for displaying any one of the information on the amount of power generation of the renewable energy, information on an amount of electricity sold by the battery exchange service, and information on a difference between the amount of power generation and the amount of electricity sold.

Another aspect of the present invention provides a terminal of a battery exchange service system, the terminal including: an information obtaining unit for obtaining battery information and user information; an information storage unit for storing in advance the battery information and the user information; a verification unit for verifying the battery information and the user information obtained by the information obtaining unit, by the battery information and the user information stored in the information storage unit; a charging and discharging unit for charging and discharging a battery pack; a power information generation unit for generating information on an amount of electricity based on charging and discharging by the charging and discharging unit; and a charge calculation unit for calculating a charge based on the information on the amount of electricity.

The present invention also provides a terminal of a battery exchange service system, the terminal being connected to a management server and including: an information obtaining unit for obtaining battery information and user information; a charging and discharging unit for charging and discharging a battery pack; a power information generation unit for generating information on an amount of electricity based on charging and discharging by the charging and discharging unit; an information transmission unit for transmitting to the management server the battery information and the user information obtained by the information obtaining unit and the information on the amount of electricity generated by the power information generation unit; and a reception unit for receiving the battery information and the user information stored in an information storage unit of the management server, information on results of verification of the transmitted battery information and the transmitted user information, and information on a charge calculated by a charge calculation unit of the management server based on the transmitted information on the amount of electricity.

A charging method for the battery exchange service system according to the present invention is a charging method for a battery exchange service system including a terminal and a management server connected with each other, wherein the terminal performs an information obtaining step of obtaining battery information and user information; a charging and discharging step of charging and discharging a battery pack;

and a power information generation step of generating information on an amount of electricity based on the charging and the discharging, and at least one of the terminal and the management server performs a verification step of verifying the battery information and the user information obtained in the information obtaining step; and a charge calculation step of calculating a charge based on the information on the amount of electricity.

The charging method for the battery exchange service system according to the present invention further includes, after the step of calculating the charge, a step of displaying information on first cost bearing for maintaining and operating the battery exchange service system and information on second cost bearing for use in other than the first cost bearing, wherein a user is allowed to select one of the first cost bearing and the second cost bearing.

Further, the present invention is characterized in that a use of the second cost bearing is any one of a donation to a disaster or the like, a general fundraising activity, a consideration for an environmental value, and an investment in a project.

Still another aspect of the present invention provides a portable device including: a battery pack installed in the portable device; a location detection unit for detecting a current location; a capacity detection unit for detecting a dischargeable capacity remaining in the battery pack; a place information obtaining unit for obtaining information on a place where a battery exchange service can be received; and a display unit for displaying the information on the place where the battery exchange service can be received obtained by the place information obtaining unit, when the capacity detection unit detects that the dischargeable capacity remaining in the battery pack is less than or equal to a certain value or/and when it is detected that the current location detected by the location detection unit approaches the obtained place where the battery exchange service can be received.

The present invention provides a battery exchange service system including a terminal and a management server connected with each other, wherein the terminal includes an information obtaining unit for obtaining battery information and user information; a charging and discharging unit for charging or discharging a battery pack; a power information generation unit for generating information on an amount of electricity based on charging or discharging by the charging and discharging unit; and an information transmission unit for transmitting to the management server the battery information, the user information, and the information on the amount of electricity, and the management server includes an information reception unit for receiving the battery information, the user information, and the information on the amount of electricity from the terminal; a battery information database for storing battery information distributed in the battery exchange service system; a contractor information database for storing contractor information for the battery exchange service system; a battery information verification unit for verifying the battery information by the battery information stored in the battery information database; a user information verification unit for verifying the user information by the contractor information stored in the contractor information database; a charge calculation unit for calculating a charge based on the information on the amount of electricity; and a transmission unit for transmitting to the terminal a result of verification of the user information, a result of verification of the battery information, and the charge. Accordingly, normally, a user can charge and repeatedly use a secondary battery, and when a battery pack is deteriorated or when a battery pack cannot be charged, the battery pack can be exchanged for a charged battery pack. Hence, a battery pack or a device using a battery pack does not need to manage the amount of charging and discharging, cycle degradation of a battery pack and the like does not need to be predicted, and power purchased by the user can be accurately and equally calculated. The charging and discharging unit should perform charging or discharging, simplifying the configuration. In another embodiment, the charging and discharging unit performs charging and discharging, whereby a transaction taking into consideration the amount of charge remaining in a battery pack is made possible.

Battery information in the present invention may be included in advance in a barcode or mark printed on a surface of a battery pack or in an IC chip embedded in a battery pack. By thus using a barcode, mark, or IC chip, battery information can be easily obtained by a digital signal and thus it is convenient.

The present invention provides a system in which the power information generation unit generates information on an amount of electricity based on a difference between an amount of charge of a first battery pack to be provided to a user and an amount of charge remaining in a second battery pack taken back from the user. Thus, even if there is a certain amount of charge remaining or if a battery pack is exchanged when convenient, the user can receive a service without wasting the amount of charge remaining and thus the battery exchange service system of the present invention can be smoothly operated. Since information on the amount of electricity is generated by a power information generation unit of a terminal, there is no need to provide a measuring device to a battery pack and thus there is no increase in cost for the battery pack. As such, without making a significant change to current battery packs, the battery exchange system of the present invention can be operated. In addition, since in the battery exchange service of the present invention the amount of charge remaining in a battery pack can be regenerated, the amount of charge remaining is not wasted.

In the present invention, since the charging and discharging unit has a function of regenerating power discharged from the second battery pack, amounts of charge remaining in collected battery packs can be effectively used.

In the present invention, the terminal further includes a dropping opening for the second battery pack; and a take-out opening for the first battery pack, and the charging and discharging unit further includes a control unit for fully charging a battery pack present near the take-out opening. Accordingly, an automatic battery exchanger can be provided. Since battery packs closer to the take-out opening are fully charged, chemical reactions occurring in battery packs can be reduced and fully charged battery packs can be promptly provided.

In the present invention, the management server further includes an amount-of-power-generation information reception unit for receiving information on an amount of power generation of renewable energy; and an information processing unit for calculating an amount of sales of renewable energy that can be sold, based on the information on the amount of power generation and the information on the amount of electricity. As a result, renewable energy with a high environmental value can be sold.

The terminal of the present invention further includes a display unit for displaying any one of the information on the amount of power generation of the renewable energy, information on an amount of electricity sold by the battery exchange service, and information on a difference between the amount of power generation and the amount of electricity sold. Thus, a user can verify such information.

The present invention provides a terminal of a battery exchange service system, the terminal including: an information obtaining unit for obtaining battery information and user information; an information storage unit for storing in advance the battery information and the user information; a verification unit for verifying the battery information and the user information obtained by the information obtaining unit, by the battery information and the user information stored in the information storage unit; a charging and discharging unit for charging and discharging a battery pack; a power information generation unit for generating information on an amount of electricity based on charging and discharging by the charging and discharging unit; and a charge calculation unit for calculating a charge based on the information on the amount of electricity. Thus, the terminal alone can perform battery exchange.

In a charging method for a battery exchange service system of the present invention, when a charge is made to a user, settings for first cost bearing for maintaining and operating the battery exchange service system and for second cost bearing used for a use other than the first cost bearing are prepared and a user can select one of the first cost bearing and the second cost bearing. A use of the second cost bearing is any one of a donation to a disaster or the like, a general fundraising activity, consideration for environmental value, and an investment in a project. As a result, by using the battery exchange service system of the present invention, donations, support funds, contributions, aid funds for the promotion of the use of natural energy, and the like can be easily collected.

A portable device of the present invention includes: a battery pack installed in the portable device; a location detection unit for detecting a current location; a capacity detection unit for detecting a dischargeable capacity remaining in the battery pack; a place information obtaining unit for obtaining information on a place where a battery exchange service can be received; and a display unit for displaying the information on the place where the battery exchange service can be received obtained by the place information obtaining unit, when the capacity detection unit detects that the dischargeable capacity remaining in the battery pack is less than or equal to a certain value or/and when it is detected that the current location detected by the location detection unit approaches the obtained place where the battery exchange service can be received. Accordingly, when the amount of charge remaining in a power source of a portable device owned by a user becomes small, the user can obtain information on a place which is close to the current location and where a battery exchange service can be received. Hence, the battery exchange service provided by the present invention can be smoothly performed.

BRIEF DESCRIPTION OF THE DRAWINGS

FIG. 5 is a diagram describing a battery pack verification screen;

FIG. 10 is a diagram showing an exemplary display of first service content for battery exchange;

FIG. 11 is a diagram showing an exemplary display of second service content for battery exchange; and FIG. 12 is a diagram showing an exemplary display of third service content for battery exchange.

Figure 1:
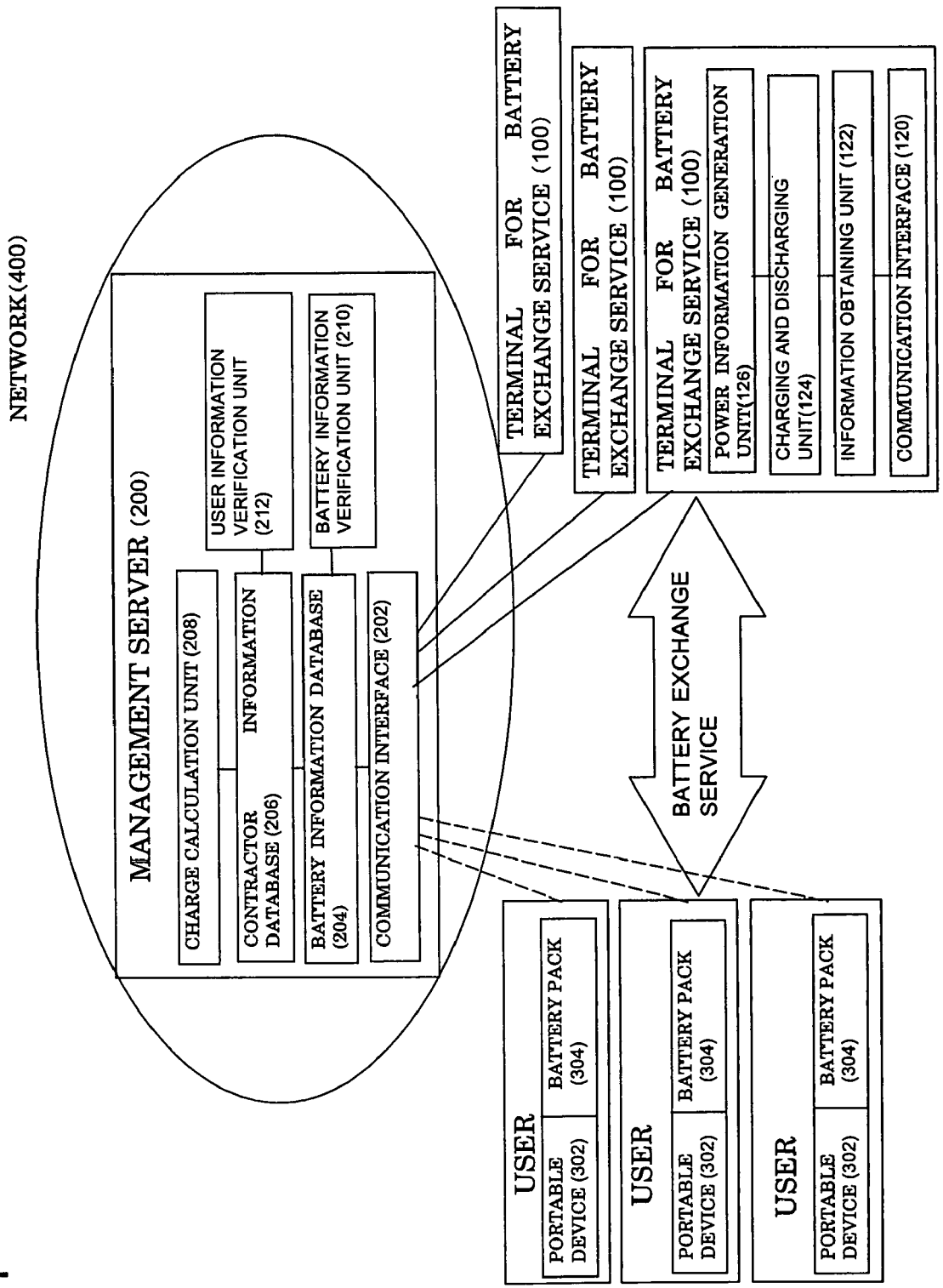
FIG. 1 is a configuration block diagram of a battery exchange service system of the present invention.

10 a automatic terminal equipment
11 a dropping opening for a battery pack
12 a take-out opening for a battery pack
22 a dischargeable capacity detection unit
23 a location information detection unit
100 a terminals for a battery exchange service
120 a communication interface
122 an information obtaining unit
124 a charging and discharging unit
126 a power information generation unit
200 a management server
202 a communication interface
204 a battery information database
206 a contractor information database
208 a charge calculation unit
210 a battery information verification unit
212 a user information verification unit
302 a portable device
304 a battery pack

DESCRIPTION OF THE PREFERRED EMBODIMENTS

An outline of a battery exchange service system of the present invention will be described below.

The battery exchange service system of the present invention includes terminals and a management server connected with each other. Here, the terminals each have a function of obtaining battery information and user information, charging and discharging a battery pack, and generating information on the amount of electricity based on the charging and the discharging. The battery information, user information, and information on the amount of electricity which are obtained by the terminal are transmitted to the management server. The management server has a function of verifying the battery information and user information received from the terminal and calculating a charge based on the information on the amount of electricity. Then, the management server transmits to the terminal a result of verification of the user information, a result of verification of the battery information, and the charge.

A method of generating information on the amount of electricity of a battery pack in the battery exchange system will be described.

It is assumed that the amount of charge of a battery pack 1 in a fully charged state is Q1I and the amount of charge of a battery pack 2 in a fully charged state is Q2I. When both battery packs are new and fully charged, their amounts of charge are equal and thus Q1I=Q2I. For example, it is assumed that a user repeatedly charges and discharges and uses the battery pack 1 and when the amount of electricity used (represented as "Q1U") reaches half of the amount of charge in a fully charged state, the user uses a service of the present invention in a shop where a terminal is installed and the battery pack 1 is exchanged for the battery pack 2. Alternatively, it is assumed that when the user is away from home or office and cannot charge the battery pack 1, the user uses a service of the present invention in a shop where a terminal is installed and the battery pack 1 is exchanged for the battery pack 2. In this case, consideration to be paid by the user to a service provider is determined using the amount of electricity Q1U and the amount of charge Q2I.

For a simpler calculation method, an amount of charge remaining Q1R is calculated based on a relationship between the amount of charge Q1I and the amount of electricity Q1U (Q1R=Q1I−Q1U). Then, by subtracting the amount of charge remaining Q1R from the amount of charge Q2I of the exchanged battery pack 2, an amount of charge Q2S purchased by the user is calculated (Q2S=Q2I−Q1R).

More preferably, there is a method in which the amount of charge remaining Q1R in the collected battery pack 1 is actually measured and, as with the above, the amount of charge remaining Q1R is subtracted from the amount of charge Q2I of the exchanged battery pack 2, whereby the amount of charge Q2S purchased by the user is calculated. In this case, the amount of charge Q1I is substantially equal to the amount of charge Q2I and the amount of charge remaining Q1R is half of the amount of charge Q1I in a fully charged state; thus, the user should pay the service provider consideration calculated by multiplying about half of the amount of charge Q2I of the battery pack 2 by a power unit price.

The present invention is based on the premise that normally the user him/herself repeatedly charges and discharges and uses a battery pack. Thus, by actually measuring the amount of charge remaining Q1R in the battery pack 1, even if the battery pack is deteriorated due to the user repeatedly charging and discharging the batter pack, complex mechanisms for predicting cycle degradation and storing the number of uses and the degree of deterioration are not particularly required.

In addition, since normally the user charges a battery pack using commercial power, an electricity charge for charging is very low and thus the user can charge the battery pack without worrying about an electricity charge for charging.

For example, it is assumed that the user him/herself repeatedly charges and discharges and uses a battery pack K and the battery pack K is deteriorated and thus battery capacity QKT is reduced to half of that of a new battery pack; as a result, an amount of charge QKI in a fully charged state is reduced to half of an amount of charge Q1I of a new battery pack in a fully charged state. In the case in which the user receives a battery exchange service when the user has used up the amount of charge QKI of the battery pack K, the amount of charge QKI of the battery pack K in a fully charged state is half of the amount of charge Q1I of a new battery pack in a fully charged state. Namely, an amount of electricity QKU used by the user is the same as the amount of electricity Q1U obtained when half of the amount of charge Q1I of a new battery pack in a fully charged state is used. Since the amount of charge QKI of the battery pack K is used up, the amount of charge remaining in the battery pack K becomes zero. Accordingly, consideration to be paid by the user to the service provider when the user receives a service of the present invention and the battery pack is exchanged for the battery pack 2 which is not deteriorated, is a value obtained by subtracting zero from the amount of charge Q2I. That is, the consideration is an amount obtained by multiplying all the amount of charge Q2I by a power unit price. This in turn to pay a cost that is double what it is when the battery pack is not deteriorated. In practice, in the course of deterioration, a battery is used by some users and thus an amount of a payment corresponding to deterioration is added up. Hence, in this mechanism, consideration for deterioration can be equally collected. That is, the cost of recycling battery packs can be equally collected. This will be described in Example 4, as will be described later, putting numerical values.

A further description will be made putting numerical values.

A battery pack A is a new battery pack or equivalent to a new battery pack, the battery capacity is 1000 mAh, and the dischargeable capacity in a fully charged state is 1000 mAh.

A battery pack B is a battery pack deteriorated by 70% and its battery capacity is degraded by 70% and 700 mAh. The dischargeable capacity of the battery pack B in a fully charged state is 700 mAh.

A battery pack C is a battery pack deteriorated by 50% and its battery capacity is degraded by 50% and 500 mAh. The dischargeable capacity of the battery pack C in a fully charged state is 500 mAh.

Though it is expected that in actuality a battery pack deteriorated by 50% cannot be distributed, for description'8s sake a battery pack deteriorated by 50% is assumed.

It is assumed that the power consumption of a portable terminal using the battery packs is 250 mAh per hour.

It is assumed that charging is ¥(Japanese YEN)0.1/mAh.

Under such assumption, the usage states of the respective battery packs will be described using the following Examples 1 to 4.

EXAMPLE 1

Battery pack to be exchanged: A1 (the battery capacity is 1000 mAh and the dischargeable capacity is 1000 mAh)

Battery pack to be provided in exchange: A2 (the battery capacity is 1000 mAh and the dischargeable capacity in a fully charged state is 1000 mAh)

When the user repeatedly charges and discharges and uses the battery pack A1 (note that it is assumed in Example 1 that there is almost no capacity degradation) and has used a dischargeable capacity of the battery pack A1 of 500 mAh (the user has used the device for two hours after the device is fully charged), the user uses an exchange service.

Dischargeable capacity charged in the battery pack A2 to be provided to the user: 1000 mAh Dischargeable capacity remaining in the battery pack A1 taken back from the user: 500 mAh Charge to be paid by the user: 1000 mAh−500 mAh=500 mAh→→→¥50

EXAMPLE 2

Battery pack to be exchanged: B1 (the battery capacity is 700 mAh due to degradation and the dischargeable capacity is 700 mAh)

Battery pack to be provided in exchange: A2 (the battery capacity is 1000 mAh and the dischargeable capacity in a fully charged state is 1000 mAh)

When the user him/herself repeatedly charges and discharges and uses the battery pack B1 and has used a dischargeable capacity of the battery pack B1 of 500 mAh (the user has used the device for two hours after the device is fully charged), the user uses an exchange service.

Dischargeable capacity charged in the battery pack A2 to be provided to the user: 1000 mAh Dischargeable capacity remaining in the battery pack B1 taken back from the user: 200 mAh Charge to be paid by the user: 1000 mAh−200 mAh=800 mAh→→→¥80

EXAMPLE 3

Battery pack to be exchanged: A1 (the battery capacity is 1000 mAh and the dischargeable capacity is 1000 mAh)

Battery pack to be provided in exchange: B2 (the battery capacity is 700 mAh due to degradation and the dischargeable capacity in a fully charged state is 700 mAh)

When the user him/herself repeatedly charges and discharges and uses the battery pack A1 and has used a dischargeable capacity of the battery pack A1 of 500 mAh (the user has used the device for two hours after the device is fully charged), the user uses an exchange service.

Dischargeable capacity charged in the battery pack B2 to be provided to the user: 700 mAh Dischargeable capacity remaining in the battery pack A1 taken back from the user: 500 mAh Charge to be paid by the user: 700 mAh−500 mAh=200 mAh→→→¥20

EXAMPLE 4

Battery pack to be exchanged: C1 (the battery capacity is 500 mAh due to degradation and the dischargeable capacity is 500 mAh)

Battery pack to be provided in exchange: A2 (the battery capacity is 1000 mAh and the dischargeable capacity is 1000 mAh)

When the user repeatedly charges and discharges and uses the battery pack C1 and has used a dischargeable capacity of the battery pack C1 of 500 mAh (the user has used the device for two hours after the device is fully charged), the user uses an exchange service.

Dischargeable capacity charged in the battery pack A2 to be provided to the user: 1000 mAh Dischargeable capacity remaining in the battery pack C1 taken back from the user: 0 mAh Charge to be paid by the user: 1000 mAh−0 mAh=1000 mAh→→→¥100

Example 1 is an ideal case. Example 2 shows the case in which the battery pack B1 to be exchanged is deteriorated. When the battery pack B1 to be exchanged is deteriorated, the charge is comparatively high as comparing with the case of Example 1 in which the battery pack A1 which is not deteriorated is exchanged. Here, the case in which the battery pack B1 to be exchanged is deteriorated by 70% is described. However, normally, a battery pack is deteriorated little by little and thus is deteriorated in the course of the user him/herself repeatedly charging and discharging and using the battery pack. Hence, the user pays a high charge for an amount corresponding to the deterioration, when the user receives a new battery pack upon a next exchange service.

In contrast, when, as shown in Example 3, the battery pack B2 to be received in an exchange service is deteriorated, the user can use the service at a rate lower by ¥30 than the case of Example 1. By this, even if the user is provided with a deteriorated battery pack, the user does not suffer any monetary loss. This ¥30 difference is appropriated for a difference of ¥30 (comparison between Examples 1 and 2) made when a service of the present invention is used by using that battery pack and using the deteriorated battery pack B1, as with Example 2. Accordingly, service charges are equal and deteriorated battery packs can also be used for services.

In Example 4, since the battery pack C1 to be exchanged is deteriorated by 50%, when the dischargeable capacity is used up and the user uses an exchange service, the charge to be paid by the user is high. However, this is because the user has used up the dischargeable capacity of the battery pack C1, and thus, it is equal.

Namely, in the battery exchange service system of the present invention, by performing charging based on a difference between the remaining dischargeable capacity and the dischargeable capacity of a newly provided battery, charging taking into account the remaining dischargeable capacity and deterioration of a battery pack is made possible and users equally bear charges.

Accordingly, the present invention is not related to the purchase or rental of battery packs. Namely, the user can bear a difference in the amount of power and deterioration of a battery pack upon battery exchange, according to a usage state without the user being aware of them. As such, whatever battery pack the user uses, the user can use a battery pack without noticing that there is degradation from its initial battery capacity. Alternatively, even when the user uses a battery pack feeling that the usable time of a battery pack is reduced a bit lately and thus the battery capacity is decreasing, it is considered that a state in which the user is unable to quantitatively grasp the degree of the degradation of the battery capacity is a normal situation; however, in the service system of the present invention, the user can equally bear degradation of battery capacity without the user being aware of it.

In a conventionally proposed case, when, for example, a battery pack that can be charged only to 600 mAh because the battery pack is repeatedly charged and discharged by a user and thus deteriorated, resulting in a battery capacity of 600 mAh, is exchanged for a new battery pack having a battery capacity of 1000 mAh and a dischargeable capacity of 1000 mAh, in order to detect degradation of the battery capacity of the battery pack, a function of detecting the number of charges and a communication means, or a means of detecting an amount of the battery used and a communication means are required.

On the other hand, the battery exchange service system of the present invention is a system for performing charging based on a difference between the remaining dischargeable capacity and the dischargeable capacity of a newly provided battery pack. Therefore, when a battery pack deteriorated by being repeatedly charged and discharged by a user gets an exchange service, the user turns out to pay a higher charge, as compared with the case in which the user uses an exchange service for a battery pack that is not deteriorated. In this manner, users equally pay for an amount of a charge corresponding to deterioration of a battery pack. In addition, the difference can be appropriated for collection of deteriorated battery packs and recycling costs.

The above description is made of the method in which charging is performed such that a difference in the amount of charge of a battery pack upon battery exchange and battery capacity suffering degradation are calculated using the same unit price. Now, a method will be described of setting charges such that a unit price for the amount of charge of a battery pack is made different from a unit price for degradation of battery capacity, so as to efficiently cover recycling costs.

For example, when the power charge is ¥0.1/mAh, as with the above, and degradation is ¥0.2/mAh, the above-described examples are as follows.

EXAMPLE 1

Dischargeable capacity charged in the battery pack A2 to be provided to the user: 1000 mAh Dischargeable capacity remaining in the battery pack A1 taken back from the user: 500 mAh Amount of battery capacity corresponding to degradation: 0 mAh Charge to be paid by the user: 1000 mAh−500 mAh=500 mAh $$500 \text{ mAh} \times ¥0.1 + 0 \text{ mAh} \times ¥0.2 = ¥50$$

EXAMPLE 2

Dischargeable capacity charged in the battery pack A2 to be provided to the user: 1000 mAh
Dischargeable capacity Remaining in the battery pack B1 taken back from the user: 200 mAh
Amount of battery capacity corresponding to degradation: 300 mAh
Charge to be paid by the user: 1000 mAh−200 mAh=800 mAh $$800\ mAh \times ¥0.1 + 300\ mAh \times ¥0.2 = ¥80 + ¥60 = ¥140$$

EXAMPLE 3

Dischargeable capacity charged in the battery pack B2 to be provided to the user: 700 mAh
Dischargeable capacity remaining in the battery pack A1 taken back from the user: 500 mAh
Amount of battery capacity corresponding to degradation: −300 mAh
Charge to be paid by the user: 700 mAh−500 mAh=200 mAh $$200\ mAh \times ¥0.1 + (-300\ mAh) \times ¥0.2 = ¥20 - ¥60 = -¥40$$

In Example 3, since the user receives a deteriorated battery pack, when the user receives a service this time, the user receives an amount appropriate to the deterioration once (in practice, such an amount is compensated when the battery pack is exchanged for a new battery pack next time).

It is also possible to use a mechanism in which power to be purchased has a fixed rate and only an amount of battery capacity corresponding to degradation is charged according to degradation conditions. The case, for example, in which a portion of a power charge for the above-described case in which a unit price for the actual power portion is made different from that for an amount of battery capacity corresponding to degradation is defined as a fixed rate of ¥20 per exchange will be exemplified as follows.

EXAMPLE 1

Charge to be paid by the user: 1000 mAh−500 mAh=500 mAh $$¥20 + 0\ mAh \times ¥0.2 = ¥20$$

EXAMPLE 2

Charge to be paid by the user: 1000 mAh−200 mAh=800 mAh $$¥20 + 300\ mAh \times ¥0.2 = ¥20 + ¥60 = ¥80$$

EXAMPLE 3

Charge to be paid by the user: 700 mAh−500 mAh=200 mAh $$¥20 + (-300\ mAh) \times ¥0.2 = ¥20 - ¥60 = -¥40$$

As such, in the system described here, the dischargeable capacity remaining in a collected battery pack and the dischargeable capacity of a battery pack to be provided to a user are measured on the service provider side and managed and used for a charging method. By this, a function of managing the amount of charge and a function of managing the number of charges and discharges do not need to be provided to a battery pack itself, and furthermore, consideration for deterioration of a battery pack can be equally collected from users.

Generally, when the dischargeable capacity remaining in a battery pack becomes lower than or equal to a current value required for a device, the battery pack cannot be discharged. Hence, the remaining dischargeable capacity cannot be used up, becoming waste.

In the battery exchange service system of the present invention, a charging and discharging unit that charges and discharges a battery pack has a function of discharging a dischargeable capacity remaining in a collected battery pack and then regenerating the remaining dischargeable capacity. As such, since the charging and discharging unit has the function of regenerating a dischargeable capacity remaining in a battery pack, power remaining in the battery pack can be used without waste, which is desirable in terms of energy conservation. This discharging condition can be appropriately selected. When the aim is to take out all dischargeable capacity remaining in a battery pack, discharging should be performed slowly at a low current value. To set effective remaining dischargeable capacity in a state in which a device is installed, as a reference capacity, a simulated discharging pattern for the kind of device having installed therein a battery pack is prepared in advance and discharging is performed using the simulated discharging pattern, whereby remaining dischargeable capacity can be measured in the same condition as that for when a battery pack is installed in the device.

Furthermore, in another invention of the present invention, by using a battery exchange service system, donations to disasters, etc., general fundraising activities, consideration for environmental value, investments in projects, and the like are implemented. In such an invention, when charging a user for a charge for an amount of electricity used, at least two types of settings which are selectable by the user are prepared. Then, it is attainable by a charging method characterized in that part or all of the charge made is used for a use other than a use of a charge obtained by normal charging.

As used herein, the term "use of a charge obtained by normal charging" refers to the use for maintaining, managing, and operating a battery exchange service system of the present invention. It further includes so-called necessary expenses for providing a battery exchange service including sales management costs, profits, and the like of a company that provides the battery exchange service.

On the other hand, the use other than the use of a charge obtained by normal charging includes relief funds for or donations to disasters which are raised by general fundraising activities, financial aids for environmental contribution activities or medical activities, investments in promising business activities or projects, or the like. By this, part or all of consideration obtained by a service of the present invention can be used for those applications.

Since a product of a battery exchange service system of the present invention is power, added value can be set by, for example, determining the type of electricity by a power generation method or the like. By thus setting added value to the type of electricity, funds arose therefrom can be returned to a capital investment in, for example, a photovoltaic power generator, a wind turbine generator, a micro-hydroelectric generator, or a fuel battery or gas engine power generator, which generates renewable energy with a low environmental load, or can be used as aid funds for existing equipment owners.

Although with the increased awareness of environmental problems the renewable energy has begun to proliferate in recent years, power generation costs for the renewable energy are higher than those for conventional power, which is a bottleneck in further proliferation.

Meanwhile, power to be provided by a battery exchange service system of the present invention has very high added value. As an example, chargers using dry batteries are proliferated. Assuming that a dry battery is purchased at ¥100 and charging can be performed two times using the dry battery, since the battery capacity of mobile phones is on the order of 2.5 to 3 Wh, when the battery capacity of a mobile phone is 3 Wh, ¥50/3 Wh=¥16/Wh. On the other hand, since household power is the order of ¥25/kWh (=¥0.025/Wh), the rate of power to be used for a power source of a mobile device under some circumstances is 640 times higher.

Accordingly, bearing of an amount corresponding to environmental added value by a mechanism in which power obtained by renewable energy is used as part of power to be used for a battery exchange service system of the present invention or a mechanism in which power used for a service of the present invention and power obtained by renewable energy are compensated in a pseudo manner, is very effective to use for aid funds for the promotion of the use of renewable energy.

When, in the above-described manner, a use such as a donation or aid fund is selected by user's intention and power for the use is used, it is also possible to set a special function that makes a difference from normal times, such as adding a message describing such a selection to the end of an E-mail, changing the color of a display lamp lighting up during the use of a device such as during communication, making a ringtone upon receiving information a special one, or providing the right to obtain ringtone melodies or software downloading services for free or at advantageous rates. Such a special function is valid while purchased power is used. To manage the termination of the special function, the management may be performed by an amount of power actually used or by a method, for example, in which, though accuracy is reduced, simply the special function is valid until next charging. Whether the function is valid or invalid can be arbitrarily set by a user.

Portable devices in the present invention are portable electronic devices such as mobile phones, notebook computers, PDAs, electronic books, digital cameras, and video cameras. In addition, in the present invention, a battery exchange service system can be constructed not only in portable devices but also in mobile devices that do not have a communication function, such as electric-assist bicycles, electric vehicles, and cordless cleaners. Furthermore, the application of the present invention is not limited to portable or mobile devices and any device can be used as long as the device uses a battery pack.

For battery packs in the present invention, normal secondary batteries such as lithium-ion batteries, nickel metal hydride batteries, nickel-cadmium batteries, and lead-acid batteries can be used; above all, lithium-ion batteries can be reduced in size and weight and have high power efficiency for charging and discharging, and thus, are particularly advantageous when in a service of the present invention batteries are discharged and then charged.

It is also possible to provide a battery exchange service such that labels describing battery capacity are affixed to battery packs to be newly received, to show the battery capacity and upon battery exchange at a terminal a user sees the battery capacity and selects a battery pack. As such, by affixing labels to battery packs to show the battery capacity of the battery packs, dischargeable capacity charged in battery packs can be directly shown to users, whereby users' intention can be verified. As a result, it is a natural course that battery packs that are deteriorated by users are less likely to be selected and accordingly a market can determine recycling timing.

By thus presenting battery capacity on battery packs, when batteries having the same shape have different battery capacities due to technological advances, battery packs are selected by users, making it possible to effectively operate a system.

For a charging method in the present invention, payment may be made when a user receives a service. Alternatively, a pay-later scheme can also be used in which payment is made at the end of a month based on information that can identify a user, such as an ID number or phone number of a portable device. When payment is made when a user receives a service, if it is difficult to charge for an amount of power taking into account a dischargeable capacity remaining in a battery pack upon exchange, various methods can be considered in which a discount is made later from another service charge and in which the remaining dischargeable capacity is saved for a next exchange service.

A battery exchange service system of the present invention starts with giving a battery pack to a user. At this point, by collecting from the user the establishment costs, participation fee, and membership costs for the battery exchange service system of the present invention and the actual cost of the battery pack, initial costs for the battery exchange service system can be reduced.

A portable device to be used in the present invention has a detection unit that detects a current location of the portable device; a capacity detection unit that detects a dischargeable capacity remaining in a battery pack of the portable device; a location information obtaining unit that obtains information on a place where a battery exchange service can be received; and a display unit that displays a place where a battery exchange service can be provided, according to the remaining dischargeable capacity or/and location information. By using such a portable device, a battery exchange service of the present invention can be smoothly used.

Although a battery exchange service system of the present invention is described using a second battery as a main constituent, for the above-described portable devices, even when the power source is a fuel battery, by detecting a remaining dischargeable capacity calculated based on a remaining amount of a fuel of the fuel battery, the same service system can be used.

First Embodiment
(Outline of Battery Exchange Service System)

FIG. 1 is a block diagram of one embodiment of a battery exchange service system of the present invention.

The battery exchange service system of the present invention mainly includes terminals (100) for a battery exchange service, a management server (200), and portable devices (302) owned by users. The terminals (100) and the management server (200) for a battery exchange service can be connected to each other through a network (400) such as Internet. The portable devices (302) are mobile phones, PDAs capable of performing schedule management and the like, mobile personal computers, or the like. The present invention can also be applied to devices, though not portable devices, such as cordless cleaners, electric-assist bicycles, and electric vehicles which use battery packs as their power sources.

The terminals (100) for a battery exchange service each include an information obtaining unit (122) that obtains information, such as recognizing a management number of a battery pack taken back from a user and user information; a charging and discharging unit (124) that charges and discharges the taken back battery pack and charges a battery pack to be provided to the user; a power information generation unit (126) that generates information on the amount of electricity based on a charging current and a discharging current of the charging and discharging unit (124); and a communication interface (120) including an information transmission unit that transmits, through the network (400), to the management server (200) battery information and the user information which are obtained by the information obtaining unit (122) and the information on the amount of electricity which is generated by the power information generation unit (126); and an information reception unit that receives results of verification by the management server (200) of the battery information and the user information and charge information. In the embodiment shown in FIG. 1, the charging and discharging unit (124) can perform charging and discharging. In another embodiment, the charging and discharging unit (124) is composed of a charging unit or a discharging unit that only performs charging or discharging. Though not shown in FIG. 1, a display unit is provided that displays at least information on the amount of power generation of renewable energy, information on the amount of electricity sold by a battery exchange service, information on a difference between the amount of power generation and the amount of electricity sold, and a charge.

A terminal discharges all dischargeable capacity remaining in a battery pack taken back from a user and charges a battery pack to be provided to the user. To discharge all remaining dischargeable capacity, a low discharging current should be used. Here, for regeneration of electricity, by storing in a capacitor or battery electricity discharged from the battery pack taken back from the user and using the stored electricity to charge the battery pack to be provided to the user, a waste of electricity is further reduced.

The management server (200) includes a communication interface (202) including a transmission unit and a reception unit that transmit and receive information to/from the terminals (100) for a battery exchange service through the network (400); a battery information database (204) that stores battery information on battery packs to be distributed in the battery exchange service system; a contractor information database (206) that stores contractor information; and a charge calculation unit (208) that calculates a service usage charge and the like. The management server (200) further includes a battery information verification unit (210) that checks battery information received from a terminal (100) against the battery information stored in the battery information database (204) to verify that a battery pack is one distributed in the battery exchange service system; and user information verification unit (212) that checks user information received from the terminal (100) against the contractor information stored in the contractor information database (206) to verify that a user is one who has a contract with the battery exchange service system.

The contractor information database (206) stores user information, such as contractor names, contact addresses, contractor cards for user verification, phone numbers, personal identification numbers, and fingerprints, and battery information on battery packs (304) being currently used, such as ID numbers of the battery packs and battery capacity information.

The communication interface (202) may be connected to the portable devices (302) through the network (400). The terminals (100) may include the battery information database (204), the contractor information database (206), the battery information verification unit (210), the user information verification unit (212), and the charge calculation unit (208).

(Flowchart for Battery Exchange Service)

Figure 2:
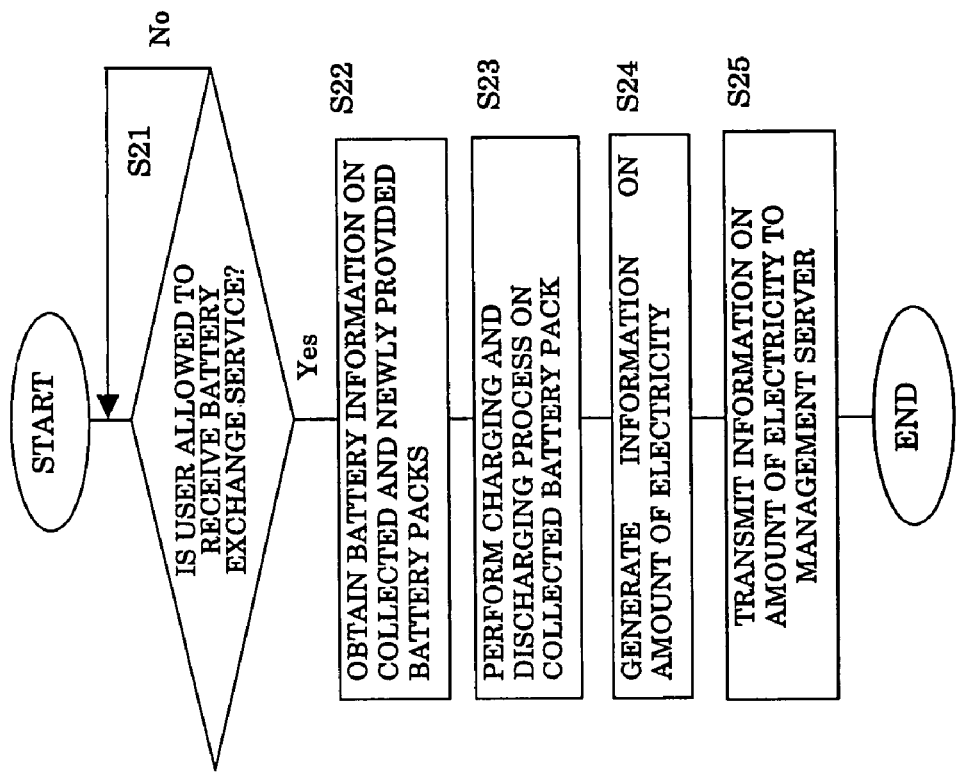
FIG. 2 is a flowchart for a terminal of the battery exchange service system of the present invention.

FIG. 2 shows a flow for a terminal of a battery exchange service system in a service of the present invention. When a user wants to receive a battery pack exchange service, the user goes to a shop or the like where a terminal (100) of a battery exchange service system is installed, and gives out a battery pack (304) of a portable device (302) being currently used. By this, a battery exchange service of the present invention starts.

First, the terminal determines whether the user is allowed to receive a battery exchange service (S21). The user can be identified by user information such as a contractor card for service use which is owned by the user or, in the case of a mobile phone, a phone number.

The thus obtained user information is transmitted to the management server (200) where user verification is performed and a result of the user verification is received by the reception unit of the terminal. If the result of verification of the user information shows that the user is allowed to receive a battery exchange service, then the terminal obtains information on a collected battery pack and a battery pack to be newly provided (S22). Methods of obtaining information include, for example, obtaining information using a barcode, inputting an ID number, and obtaining information on an IC chip embedded in a battery pack by communication. Subsequently, the terminal performs a charging and discharging process on the collected battery pack (S23), generates information on the amount of electricity based on charging and discharging information (S24), and transmits the information on the amount of electricity to the management server (200), and then ends the process.

Figure 3:
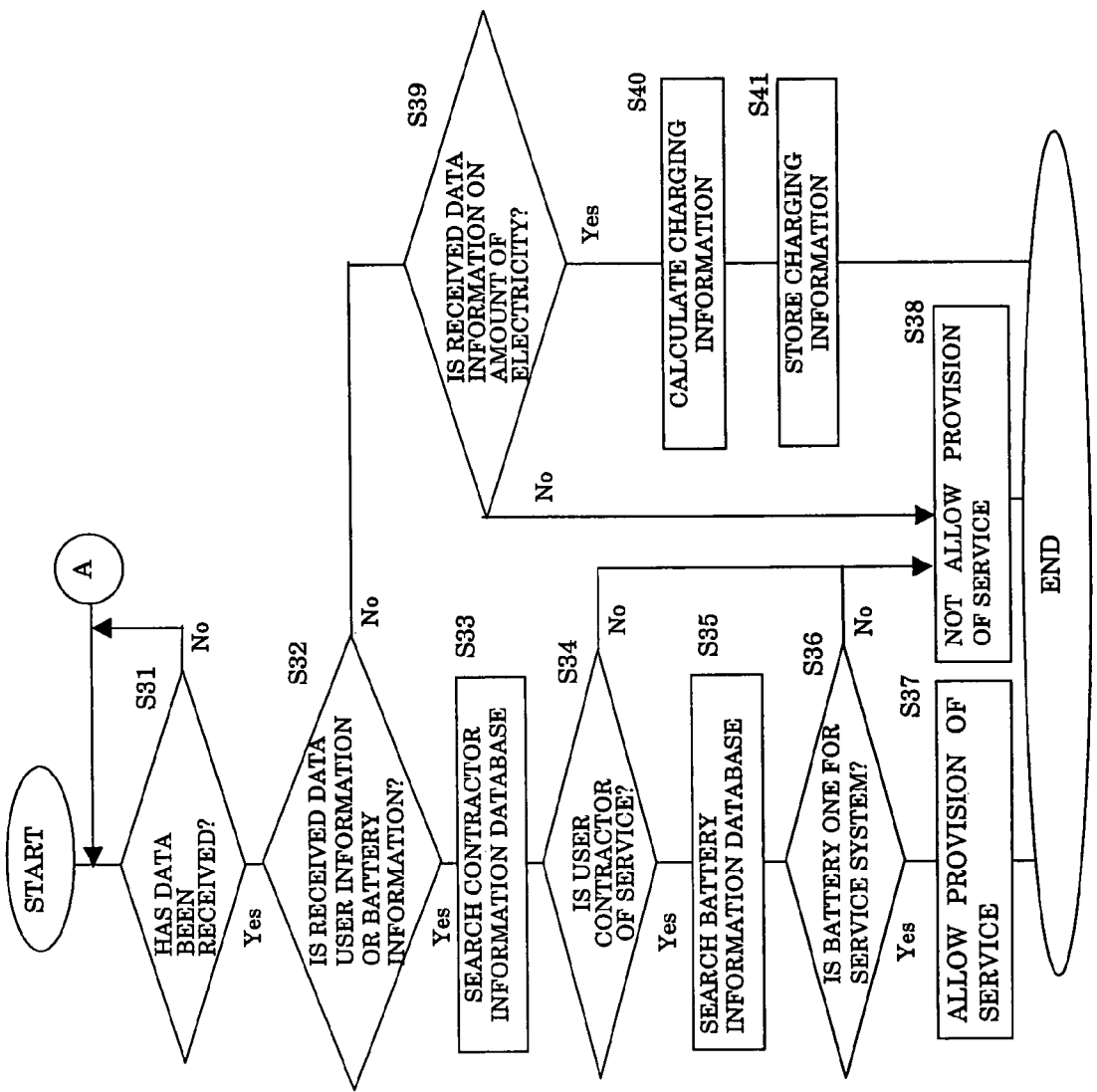
FIG. 3 is a flowchart for a management server of the battery exchange service system of the present invention.

FIG. 3 shows an example of a flow for a management server in a battery exchange service system of the present invention. The management server (200) starts an operation in response to reception of data from a terminal (100) (S31). First, the management server (200) determines whether the received data is user information or battery information (S32).

If the received data is user information, then the management server (200) accesses and searches the contractor information database (206) (S33) and verifies, by the user information verification unit (212), whether the user is a contractor of the battery exchange service system (S34). If the received data is battery information, then the management server (200) accesses and searches the battery information database (204) (S35) and verifies, by the battery information verification unit (210), whether the battery is one for the battery exchange service system (S36). It does not matter which one of the verification of a contractor and the verification of a battery pack to be performed first. If the user is a service contractor and the battery pack is one for the battery exchange service system, then the management server (200) allows the provision of a service (S37) and then ends the process.

If the user is not a service contractor and the battery pack is not one for the battery exchange service system, then the management server (200) refuses to allow the provision of a service (S38) and then ends the process. When the user is not a service contractor or when the battery pack is not the one for the battery exchange service system, the management server (200) may not only simply refuse but may also provide information urging the user to make a contract, or the like.

If, at step S32, the received data is information on the amount of electricity (S39), then the management server (200) calculates, by the charge calculation unit (208), a usage charge based on the information on the amount of electricity (S40) and stores charge information (S41) and then ends the process. If, at step S39, the received data is not information on the amount of electricity, then the management server (200) refuses to allow the provision of a service (S37) and then ends the process.

Although the first embodiment describes that a terminal in a shop where a user gives out a battery pack and a terminal in a shop where the user receives a charged battery pack are the same, the shops or terminals do not necessarily need to be the same. Namely, it is also possible that by using the fact that terminals are connected to one another through the network (400) and each terminal can transmit and receive data, the user gives out a battery pack in a certain shop and receives later a battery pack charged in another shop. It is also possible that in one same shop the user gives out a battery pack at a terminal and then receives a battery pack charged by another terminal.

Figure 4:
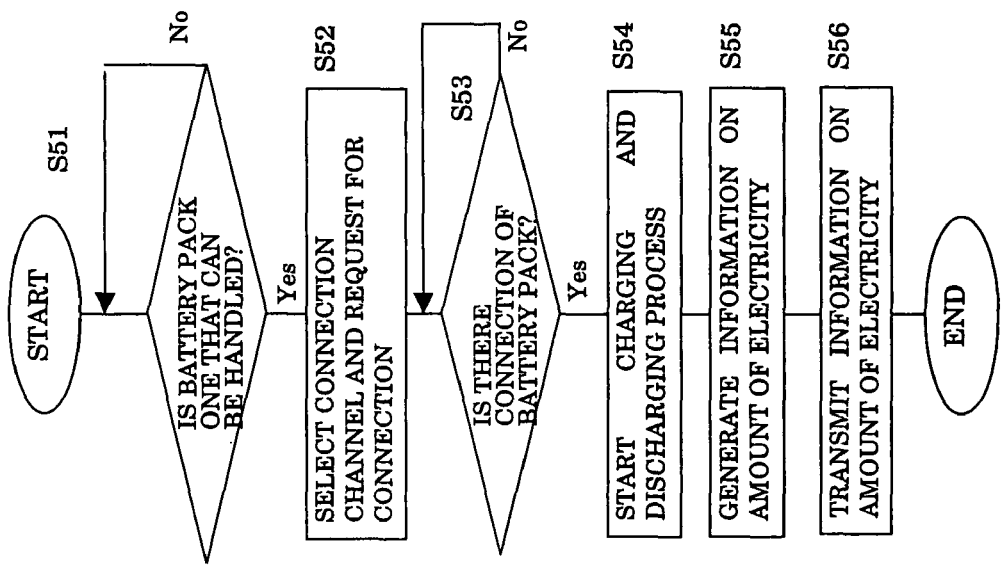
FIG. 4 is a flowchart of a battery charging and discharging process performed by the terminal of the battery exchange service system of the present invention.

FIG. 4 shows an example of a flow of a battery charging and discharging process performed by a terminal of a battery exchange service system. First, the terminal checks whether a collected battery pack is one that can be handled (S51). If the battery pack is one that can be handled, then the terminal selects a connection channel and provides a display urging connection (S52). If the terminal detects that connection is established (S53) and can verify the connection, then the terminal starts a charging and discharging process (S54). When the charging and discharging process is completed, the terminal generates information on the amount of electricity which is obtained based on charging and discharging (S55) and transmits the generated information on the amount of electricity to the management server (S56).

The information on the amount of electricity includes user information, battery information, information on the dischargeable capacity and battery capacity of the battery pack, and the like. By subtracting the dischargeable capacity remaining in the collected battery pack from dischargeable capacity of a battery pack newly provided to the user, dischargeable capacity actually provided can be calculated. The obtained information on dischargeable capacity can be used as latest dischargeable capacity (the amount of electricity provided to the user) when providing a service next time.

In the above-described embodiment, terminals are connected to a management server. However, when the terminals each include the battery information database (204), the contractor information database (206), and the charge calculation unit (208) and further include the verification unit (210) for obtained battery information and battery information in the battery information database (204) and the user information verification unit (212) for user information and user information in the contractor information database (206), the terminals do not need to be connected to the management server. That is, the terminals alone can perform battery exchange.
(Specific Example)

An outline of a service will be described using a specific case.

A contractor A repeatedly charges and discharges and uses a battery pack and thus the remaining capacity of the battery pack of a mobile phone in use has become low. Alternatively, the contractor A cannot charge the battery pack because he/she is away from home or office. Hence, the contractor A asks for provision of a service in a convenience store or mobile phone shop where a terminal of a battery exchange service system is installed. The dischargeable capacity of the battery pack is on the order of about ⅓. The terminal obtains a phone number of the contractor A and information on a barcode affixed to the battery pack to be exchanged. The terminal transmits these pieces of information to a management server. By a user information verification unit referring to a contractor information database in the management server and by a battery information verification unit referring to a battery information database, it is verified that a service can be provided to the contractor A.

Subsequently, the terminal reads a barcode affixed to a new battery pack that can be provided to the contractor A and thereby stores information on the battery pack newly provided to the contractor A. Then, the battery pack is given to the contractor A and battery exchange with the contractor A is completed.

Subsequently, the terminal starts a charging and discharging process for the battery pack collected from the contractor A. When the terminal obtains information on the battery pack, the terminal performs a selection of a channel (terminal) to connect and provides a display urging connection. When based on such information a staff member who has provided the service places the battery pack to the terminal, the terminal starts a charging and discharging process. The terminal first starts discharging of the battery pack under a predetermined condition and continues to discharge until the dischargeable capacity of the battery pack becomes 0. Electricity discharged from the collected battery pack is stored in a capacitor or battery. Alternatively, the electricity is sold to an electric power company. In the case of storing the electricity, by using the electricity to charge a battery pack to be provided, the electricity can be effectively regenerated. Then, the terminal charges the battery pack to be provided. The amount of discharge and the amount of charge at this time are stored in the contractor information database in the management server.

As a result of such measurement, information on the battery pack taken back and the battery pack newly provided to the contractor A is displayed on a display unit of the portable device as a verification screen such as the one shown in FIG. 5. The verification screen is as follow.

Battery pack taken back from contractor A
ID number: 123456
Remaining dischargeable capacity: 1 Wh
Final charge capacity: 3 Wh
Battery pack newly provided to contractor A
ID number: 654321
Dischargeable capacity: 3 Wh From the above results, the amount of power purchased in the battery exchange service used by the contractor A is calculated such that (3 Wh−1 Wh=2 Wh). When the contract condition of the contractor A is ¥20/Wh, a service usage charge of ¥40 is made to the contractor A. The final charge capacity of the battery pack with an ID number of 123456 is stored in the management server and is used when charging a user who uses a service of the present invention and is the next one to receive the battery pack with an ID number of 123456.

Although in the above-described example the case of usage-based charging is described, it is also possible that for other contract conditions, flat-rate charging may be employed to allow users to use services as many times as they want.
Second Embodiment In the above-described embodiment, the case is described in which a place where battery packs are exchanged is a convenience store or a mobile phone shop and a staff member provides a service. On the other hand, as a terminal which is like a vending machine, automatic terminal equipment allowing a user to perform all operations on the equipment can also be used.

Figure 6:
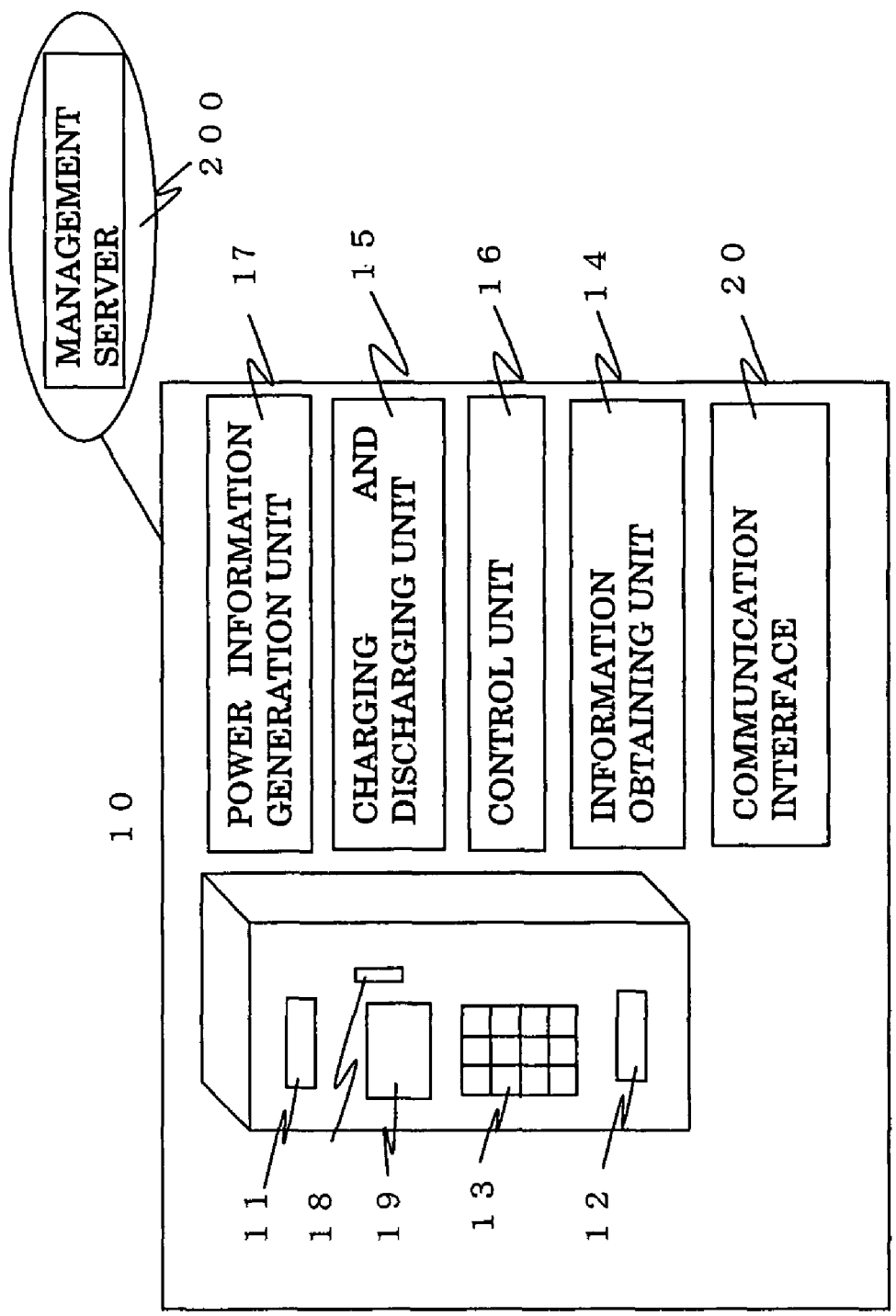
FIG. 6 is a configuration diagram of automatic terminal equipment.

FIG. 6 shows automatic terminal equipment (10). The automatic terminal equipment (10) includes a dropping opening (11) for a battery pack to be exchanged; and a take-out opening (12) for a battery pack to be provided. The automatic terminal equipment (10) stores therein 10 or more battery packs. On the automatic terminal equipment (10), when a user drops a battery pack into the dropping opening (11) and inputs user information such as a personal identification number using a keyboard input unit (13), an information obtaining unit (14) performs user verification and then performs battery pack verification. As a result of verification, if the user is a service contractor and the battery pack is one for a battery exchange service, then a power information generation unit (17) generates information on the amount of electricity, a communication interface (20) performs communication with a management server (200), a charge calculation unit (208) calculates a charge, and the charge is displayed on a display unit (19). When it is verified that the user has paid for the charge displayed from a coin insertion slot (18), a battery pack to be newly provided is sent to the take-out opening (12).

In addition to such settlement of a charge by the automatic terminal equipment, it is also possible that the dischargeable capacity of a battery pack dropped by a user is measured by the automatic terminal equipment completely discharging the battery pack, and then the dischargeable capacity of the battery pack dropped is subtracted from the dischargeable capacity of a battery pack provided, whereby a charge is calculated and the charge is paid from a user's bank account. Needless to say, it is also possible that for such calculations data is transmitted to the management server (200) one by one and charges are calculated on the management server side.

The automatic terminal equipment (10) includes a charging and discharging unit (15) and a control unit (16) that controls a charging state according to the order of battery packs to be provided in services. For example, for battery packs, such as lithium-ion batteries, whose battery deterioration is likely to advance when stored in a fully charged state, battery packs (several battery packs to be provided in subsequent services) present near the take-out opening may be fully charged and the rest of battery packs may have a dischargeable capacity of the order of 80% and may be sequentially fully charged as battery packs are provided in services. Though it depends on the type of battery pack, it is desirable from the point of view of battery life to store lithium-ion batteries in a charging state of the order of 50% to 80%. Thus, several battery packs present near the take-out opening are stored being fully charged to promptly perform battery exchange and battery packs further from the take-out opening are stored in a state in which the charging state is controlled.

The charging and discharging unit (15) and the control unit (16) may be provided not only to automatic terminal equipment but also to a shop where a staff member provides a battery exchange service.

In the above-described embodiment, terminals are connected to a management server. However, when the terminals each include the battery information database (204), the contractor information database (206), and the charge calculation unit (208) and further include the verification unit (210) for obtained battery information and battery information in the battery information database (204) and the user information verification unit (212) for user information and user information in the contractor information database (206), the terminals do not need to be connected to the management server.

Third Embodiment

A portable device will be described that can display on a display screen thereof information on dischargeable capacity and a place where a service can be provided.

Figure 7:
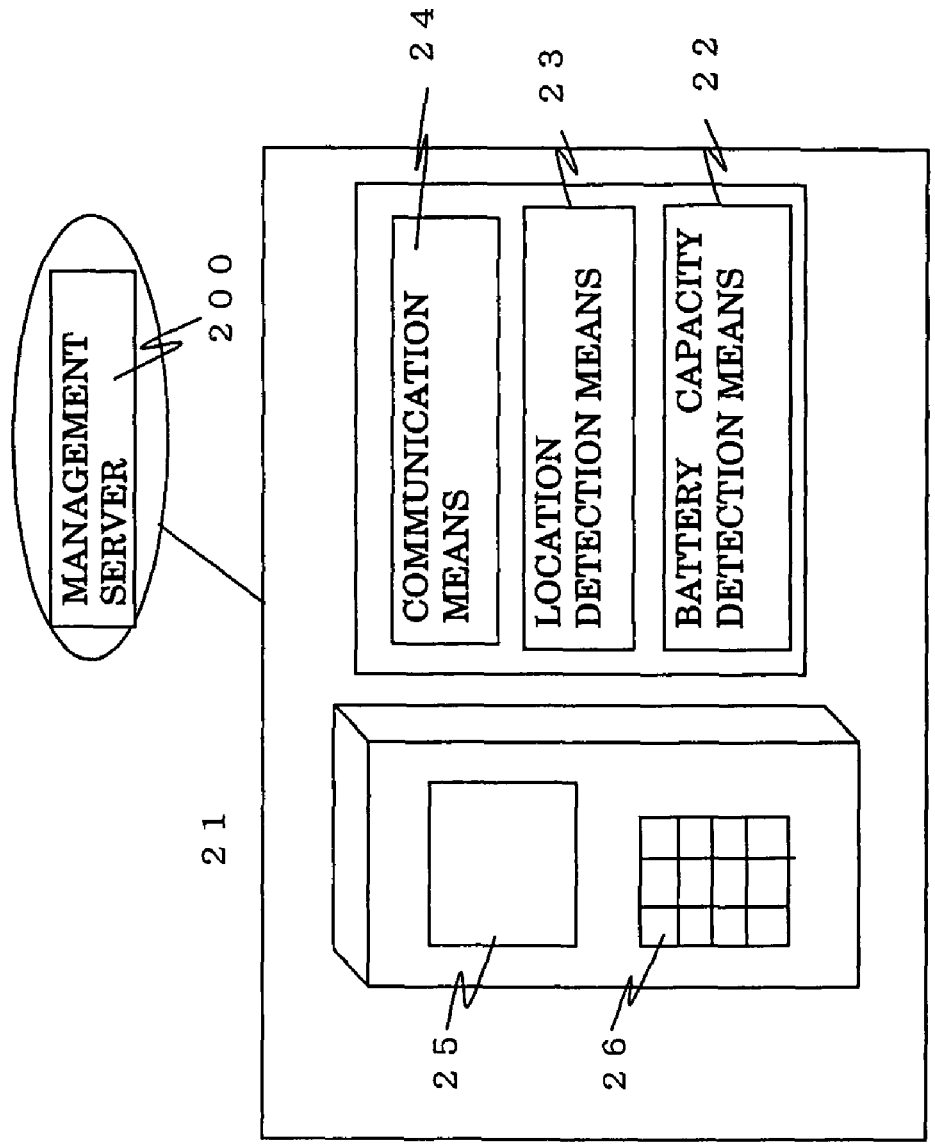
FIG. 7 is a configuration diagram of a portable device to be used in the present invention.
Figure 8:
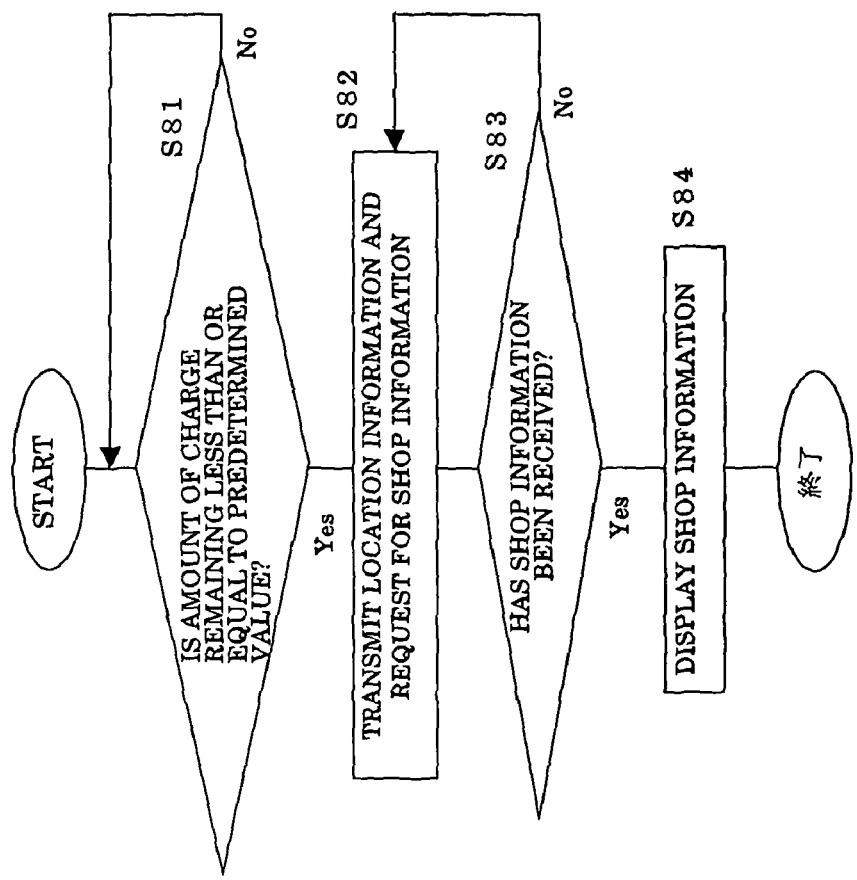
FIG. 8 is a flowchart for displaying information on a place where a battery exchange service can be provided.

A mechanism for providing a battery exchange service system is the same as that described in the first embodiment and a portable information device is characterized. FIG. 7 shows an outline of a portable device (21) owned by a contractor B. The portable device (21) owned by the contractor B includes a dischargeable capacity detection unit (22) that detects dischargeable capacity of a battery pack; a location information detection unit (23) that detects location information on the contractor B; a communication means (24) of communicating with a management server, a display (25), and a keyboard (26). FIG. 8 shows a flow for displaying by the portable device (21) a place where a battery exchange service can be provided.

If the dischargeable capacity of a battery pack of the portable device of the contractor B is less than or equal to a predetermined value (S81), then the portable device transmits location information on the contractor B to the management server (S82). Then, the portable device receives shop information from the management server (S83) and displays on the screen a place that is close to the location of the contractor B and has installed therein a terminal that performs a battery exchange service (S84).

By using a portable device such as the one described above, the dischargeable capacity of the portable device can be detected and information on a place where a service can be provided can be easily obtained, making it possible to more smoothly provide a service.

In the above-described example the case is described in which when the dischargeable capacity of a battery pack falls below the predetermined value, shop information is automatically provided. It is also possible to set such that when dischargeable capacity falls below the predetermined value, a contractor is notified of such a fact and only if the contractor wants information on a place where a service can be provided, a service is provided.

Location information on a contractor may be detected by the location of a communication base station that transmits and receives radio waves, or may be detected using a GPS function installed in a device.

Although a scheme is described in which the portable device (21) of the contractor B communicates with the management server (200), a scheme may be used in which the portable device (21) directly communicates with a nearby terminal for a battery exchange service. This can reduce the number of communication base stations for communicating with the management server. A scheme may also be used in which shop information is stored in the portable device (21) of the contractor B and a place where a battery exchange service can be provided and which is close to the location of the contractor B based on location information on the contractor B is displayed. Alternatively, a scheme may also be used in which when the contractor B approaches a terminal of the battery exchange service system, a place where a battery exchange service can be provided is displayed.

Fourth Embodiment

A charging method will be described that easily implements general fundraising activities, the buying and selling of electric power having environmental added value, and the like, using a battery exchange service system of the present invention.

Figure 9:
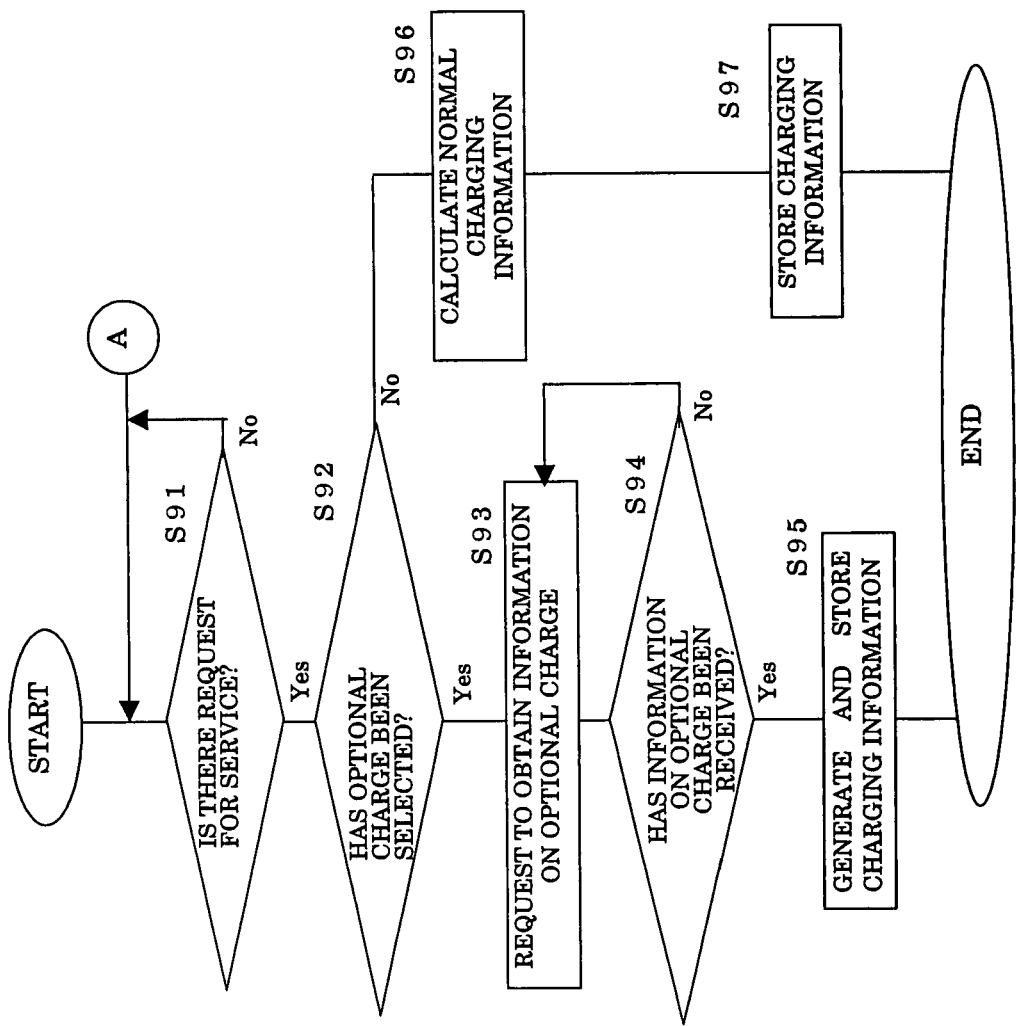
FIG. 9 is a flowchart for selecting an optional charge.

A battery exchange service system is the same as that described in the first embodiment. FIG. 9 shows a flow for selecting an optional charge. There is a request for a battery exchange service (S91) and a contractor C determines whether to select an optional charge (S92).

If the optional charge is selected, then a terminal requests a management server for information on the optional charge (S93) and then obtains the information on the optional charge from the management server (S94). Optional charging is determined by adding a normal charge to the optional charge and charging information is generated and stored (S95) and then the process ends.

If the optional charge is not selected, then a charge is calculated by a normal charging method (S96) and charging information is stored (S97) and then the process ends.

A more detailed description is made using a specific example. When the contractor C receives a service, a service charge menu has the following setting as an optional charge.

Donations to damage on city E by typhoon 21+¥2/Wh

When the amount of power for the present service by a contractor D is 3 Wh and a normal usage charge is ¥20/Wh, the contractor D normally pays ¥60 but pays ¥66 in this case.

Information on the above is transmitted to the management server and ¥60 is processed as normal charging and a ¥6 difference is paid into an account prepared for collecting donations.

In this case, ¥6 is a small amount to the contractor and thus the contractor can select the optional charge without feeling much burden and also fundraising activities can be simultaneously performed on a nationwide scale and at low cost. Accordingly, donations can be efficiently collected.

Fifth Embodiment

An outline is substantially the same as that described in the fourth embodiment. A record company R donates to a battery exchange service providing company 100000 pieces of content such as promotion videos, as a donation to the city E. When a contractor F uses a battery exchange service, such content is provided upon the battery exchange service and accordingly the contractor F purchases one piece of content at ¥5/piece. When the amount of power for the present service by the contractor F is 3 Wh and a normal usage charge is ¥20/Wh, the contractor F normally pays ¥60 but pays ¥65 in this case. Information on the above is transmitted to the management server and ¥60 is processed as normal charging and a ¥5 difference is paid under the name of record company R into an account prepared for collecting donations.

By such a mechanism, the company R can make a contribution of ¥500,000.

Sixth Embodiment

An outline is substantially the same as that described in the fourth embodiment. A case will be described of promoting the use of natural energy by an optional charge.

When a contractor G receives a service, a service charge menu has the following setting as an optional charge.

Why don't you use clean electricity generated by photovoltaic power generation?+¥1/Wh When the amount of power for the present service by the contractor G is 3 Wh and a normal usage charge is ¥20/Wh, the contractor G normally pays ¥60 but pays ¥63 in this case.

Information on the above is transmitted to the management server and ¥60 is processed as normal charging and a ¥3 difference is paid into an account prepared for the promotion of the use of natural energy.

Here, an energy unit price is calculated. The contractor G purchases the environmental value of electricity generated by natural energy at ¥1/Wh and the value is ¥1000/kWh. This value far exceeds ¥50 to ¥60/kWh which are normal power generation costs of solar batteries. Accordingly, the use of a difference between these rates (¥940 to ¥950/kWh in the above-described example) for the promotion of the use of natural energy power generation is very effective.

In this case, electricity that is directly charged from a power generation facility set up near a store, terminal, or the like may be used or only the environmental value of power which is managed through a network or the like may be handled. When a power generation facility is set up near a terminal, there is a visual effect and users can more strongly feel that they are making environmental contributions and thus it is desirable.

The environmental value of power managed through a network is that power generated by a power generation facility with high environmental value such as photovoltaic power generation is managed and power actually generated is consumed in a place where the power is generated; however, since the power has environmental value, only that value is distributed. When the contractor G purchases environmental value, even if a person who has actually set up a photovoltaic power generator uses power generated by photovoltaic power generation, it is considered that the person uses normal power; on the other hand, although the contractor G actually uses normal power, it is considered that the contractor G uses power generated by photovoltaic power generation in a pseudo manner. The same also applies to other cases such as a green power system which is already performed on companies by wind power generation.

Seventh Embodiment

The present embodiment describes another mode of the case in which only the environmental value of power managed through a network is handled. An outline of a battery exchange service is the same as that described in the first embodiment with reference to FIGS. 1 to 5. A difference is that for power for charging battery packs, power generated by a renewable facility with a low environmental load is used. Renewable power generation facilities with a low environmental load include, for example, photovoltaic power generators, wind turbine generators, biomass power generators, micro-hydroelectric generators, and fuel battery or gas engine power generators.

In the case of purchasing power having environmental value, there are cases in which power purchased last time has environmental value and in which the power does not have environmental value. Thus, the amount of power remaining in a collected battery pack and the amount of power charged in a new battery pack to be provided to a user may not be simply added or subtracted. Hence, here, the case will be described in which all charged power is simply sold. In this case, a collected battery pack does not need to be discharged, and thus, a terminal that does not have a discharging function may be used. Accordingly, in the terminals in FIG. 1, the charging and discharging units 124 have only a charging function and charging units 124*a* are used. In a service in the present embodiment, only the amount of power to be charged to a battery pack or the amount of use for a single time is charged. That is, a charging amount is not determined by subtracting the amount of power charged to a collected battery pack. As described in the first embodiment, a mechanism in which contractor information is referred to, a determination as to whether to allow the use of a service is made, and charging is performed based on information on the above, can also be similarly performed in the present embodiment.

For the present embodiment, the relationship between the amount of power generation and the amount of sales will be described for the case in which, for example, in a nationwide convenience store chain, a store A in an urban area has installed therein a terminal for a battery exchange service and a store B in a local area has installed therein a photovoltaic power generation facility.

The power generation capacity of the photovoltaic power generation facility installed in the store B is 1.5 kW and all the amount of generated electricity is sold by the store B. The photovoltaic power generation facility has a system for measuring the amount of power generation and a means of transmitting information on the amount of power generation to a management server. Information on the amount of generated power is transmitted to the management server every 30 minutes.

On the other hand, the charge capacity of a battery pack used for a battery exchange service in the store A is 8 Wh (the usage charge is ¥80/Wh) and the battery pack can be used as an auxiliary power source for a mobile phone.

It is assumed that information at 10 a.m. in a certain day is as follows. An exemplary screen display is shown in FIG. 10.

Amount of power generated by photovoltaic power generation: 1.0 kWh (1,000 kWh)

Number of service users today: 5 (40 Wh)

Power by photovoltaic power generation that can be sold: 960 Wh

It is assumed that there are no service users between 10 and 10:30 and the amount of power generated by photovoltaic power generation in the store B for such a period of time is 440 Wh. An exemplary screen display is shown in FIG. 11.

Amount of power generated by photovoltaic power generation: 1.4 kWh (1,400 Wh)

Number of service users today: 5 (40 Wh)

Power by photovoltaic power generation that can be sold: 1.360 Wh

It is assumed that there are 175 service users between 10:30 and 11 (before the reception of next information on the amount of power generation). An exemplary screen display is shown in FIG. 12.

Amount of power generated by photovoltaic power generation: 1.4 kWh (1,400 Wh)

Number of service users today: 175 (1,400 Wh)

Power by photovoltaic power generation that can be sold: 0 Wh

This state indicates that power by photovoltaic power generation is sold out until next information on power by photovoltaic power generation is received.

Since sales conditions, etc., can be thus monitored in substantially real time, even under conditions where it is difficult to achieve a balance, such as there is a 1000 times difference between the amount of power generation (the order of kW) and the amount of consumption (the order of W), environmental value can be appropriately sold and power can be sold at a single time and with a small amount. Conventionally, a certain amount of power is sold such as a yearly power contract or all power used in a concert, and thus, it is difficult to get power at a single time and with a small amount, as general users do. In the present embodiment, however, since power to be used for mobile phones which have a very high penetration rate can be sold such that environmental value is provided to the power, it is possible to allow a wide range of users to recognize the promotion of the use of renewable energy.

Here, for simplicity of description, the description is made using two stores; however, needless to say, operation can be performed with the same mechanism even when terminals for battery exchange services are installed in a plurality of stores or when photovoltaic power generation facilities are installed in a plurality of stores. The services are actually operated in such a manner.

When the amount of sales increases, it is also possible to acquire generated power from general owners of photovoltaic power generation facilities and then sell the power.

Although in the present embodiment the case of using photovoltaic power generation is introduced, any power generation facility can be applied as long as power is generated using a power generation facility with a low environmental load and the amount of power generation of the power generation facility can be monitored in real time. It can be considered that in convenience stores and the like, the invention can be effectively used for biomass power generation using garbage including, for example, boxed meals to be disposed of.

Eighth Embodiment

In the above, the case is described in which a user simply pays money to simply purchase environmental value. Here, a system will be described for the case in which in exchange for a user paying money the user can obtain points. A procedure for receiving a battery exchange service for mobile phones is the same as that descried in the sixth embodiment, except that points can be obtained.

It is assumed that when a contractor H receives a service there is the following setting.

◆Why don't you use environmentally friendly energy?+ ¥1/Wh 20 points rewarded◆

The contractor H has a 3 kWh photovoltaic power generation facility installed at home and receives, as a service for users of photovoltaic power generation which is additionally set, a service in which power generated by photovoltaic power generation is regarded to be 1 point/kWh. The points are set according to the degree of contribution to the environment (e.g., a reduction in the amount of carbon dioxide emissions). The power generated by photovoltaic power generation for a year using the power generation facility of the contractor H is 3,000 kWh and thus the contractor H is entitled to 3,000 points.

The service in the present invention and the service in which environmental value of power generated by photovoltaic power generation is converted into points, can mutually provide points by cooperation between companies providing the services. Assuming that the contractor H purchases the above-described power with environmental value 20 times through a year, 400 points are accumulated and thus the contractor H has 3400 points in total.

In recent years, it has become common for companies to make environmental contributions and also environmental contributions lead to improvements in brand image, and thus, companies are making active approaches.

A description is added assuming that, for example, there is a company such as the one below.

Company A: Exchange 3,400 points for our camping equipment set

The contractor H exchanges 3,400 points obtained by him/her making environmental contributions for a camping equipment set and can thereby obtain the camping equipment set. On the other hand, the company A provides the above-described item to the contractor H, whereby the environmental contributions made by the contractor H for a year are transferred to the company A.

By thus allowing the exchange of points between a service in the present invention and other environmental contribution support services, flexibility increases and thus various services can be developed. In addition, by widely spreading the services, it is also possible to raise awareness of the society about environmental contributions.

Although the above-described points can also be set according to the amount of power, as described in the sixth embodiment, the amount of power to be used for a battery exchange service is small but it is considered that when an amount of difference is used for an aid find to install solar batteries or the like, the degree of contribution to the environment is great, and thus, in the above embodiment the case in which points are set to high values is described.

Although here the case is described in which points for environmental contributions can be mutually added, needless to say, such points can be mutually added to other points for point services provided by credit card companies or for frequent flyer services provided by airline companies.

What is claimed is:

1. A battery exchange service system comprising:
a terminal and a management server connected with each other;
wherein the terminal includes:
an information obtaining unit for obtaining battery information and user information;
a charging and discharging unit for charging or discharging a battery pack;
a power information generation unit for generating information on an amount of electricity based on charging or discharging by the charging and discharging unit; and
an information transmission unit for transmitting to the management server the battery information, the user information, and the information on the amount of electricity; and
wherein the management server includes:
an information reception unit for receiving the battery information, the user information, and the information on the amount of electricity from the terminal;
a battery information database for storing battery information distributed in the battery exchange service system;
a contractor information database for storing contractor information for the battery exchange service system;
a battery information verification unit for verifying the battery information by the battery information stored in the battery information database;
a user information verification unit for verifying the user information by the contractor information stored in the contractor information database;
a charge calculation unit for calculating a charge based on the information on the amount of electricity; and a transmission unit for transmitting to the terminal a result of verification of the user information, a result of verification of the battery information, and the charge; and
wherein the power information generation unit generates information on an amount of electricity based on a difference between an amount of charge of a first battery pack to be provide to a user and an amount of charge remaining in a second battery pack taken back from the user.

2. The battery exchange service system according to claim 1, wherein the amount of charge of the first battery pack is determined based on an amount of charge immediately before the first battery pack is given to the user.

3. The battery exchange service system according to claim 1, wherein the charging and discharging unit has a function of regenerating power discharged from the second battery pack.

4. The battery exchange service system according to claim 1, wherein the terminal further includes;
a dropping opening for the second battery pack; and
a take-out opening for the first battery pack, and the charging and discharging unit further includes a control unit for fully charging a battery pack present near the take-out opening.

5. The battery exchange service system according to claim 1, wherein the management server further includes;
an amount-of-power-generation information reception unit for receiving information on an amount of power generation of renewable energy; and
an information processing unit for calculating an amount of sales of renewable energy that can be sold, based on the information on the amount of power generation and the information on the amount of electricity.

6. The battery exchange service system according to claim 5, wherein the terminal further includes a display unit for displaying any one of the information on the amount of power generation of the renewable energy, information on an amount of electricity sold by the battery exchange service, and information on a difference between the amount of power generation and the amount of electricity sold.

7. A terminal of a battery exchange service system, the terminal being connected to a management server and comprising:
an information obtaining unit for obtaining battery information and user information;
a charging and discharging unit for charging and discharging a battery pack;
a power information generation unit for generating information on an amount of electricity based on charging and discharging by the charging and discharging unit;
an information transmission unit for transmitting to the management server the battery information and the user information obtained by the information obtaining unit and the information on the amount of electricity generated by the power information generation unit; and
a reception unit for receiving the battery information and the user information stored in an information storage unit of the management server, information on results of verification of the transmitted battery information and the transmitted user information, and information on a charge calculated by a charge calculation unit of the management server based on the transmitted information on the amount of electricity; and
wherein the power information generation unit generates information on an amount of electricity based on a difference between an amount of charge of a first battery pack to be provided to a user and an amount of charge remaining in a second battery pack taken back from the user.

* * * * *